United States Patent [19]

Kelderman et al.

[11] Patent Number: 4,844,617
[45] Date of Patent: Jul. 4, 1989

[54] CONFOCAL MEASURING MICROSCOPE WITH AUTOMATIC FOCUSING

[75] Inventors: Herman F. Kelderman, Berkeley; Michael E. Fein, Mountain View; Alan E. Loh, Sunnyvale; Arnold Adams, Goleta; Armand P. Neukermans, Palo Alto, all of Calif.

[73] Assignee: Tencor Instruments, Mountain View, Calif.

[21] Appl. No.: 146,046

[22] Filed: Jan. 20, 1988

[51] Int. Cl.$^4$ .................. G01B 11/06; G01B 11/24
[52] U.S. Cl. .................................. 356/372; 250/201; 250/372; 356/376; 356/381; 356/328
[58] Field of Search ............... 356/326, 328, 372, 373, 356/375, 376, 381, 382, 72, 73; 250/372, 201

[56] References Cited

U.S. PATENT DOCUMENTS

| | | | |
|---|---|---|---|
| 3,912,922 | 10/1975 | Lacotte et al. | 250/204 |
| 4,674,883 | 6/1987 | Baurschmidt | 356/381 |
| 4,676,647 | 6/1987 | Kikkawa et al. | 356/382 |

OTHER PUBLICATIONS

D. K. Hamilton et al., "Surface Profile Measurement Using the Confocal Microscope", Journal of Applied Physics, 53(7), Jul., 1982, pp. 5320–5322.
T. Wilson et al., Theory and Practice of Scanning Optical Microscopy, Academic Press, (London), 1984, see especially pages 123–139.
G. Hausler et al., "Simple Focusing Criterion", Applied Optics, vol. 23, No. 15, Aug. 1, 1984, pp. 2468–2469.
J. M. Lerner et al., "Aberration Corrected Holographically Recorded Diffraction Gratings", SPIE vol. 240—Periodic Structures, Gratings, Moire Patterns and Diffraction Phenomena, 1980, pp. 72–81.
T. R. Corle et al., "Distance Measurements by Differential Confocal Optical Ranging", Applied Optics, vol. 26, No. 12, Jun. 15, 1987, pp. 2416–2420.
L. Reimer et al., "Lock–In Technique for Depth–-Profiling and Magnetooptical Kerr Effect Imaging in Scanning Optical Microscopy", Scanning, vol. 9, No. 1, 1987, pp. 17–25.

Primary Examiner—F. L. Evans
Attorney, Agent, or Firm—Thomas Schneck

[57] ABSTRACT

A confocal measuring microscope including a spectrometer and autofocus system sharing common optical elements in which the intensity of light entering the spectrometer from a particular spot on a workpiece is used to determine a focus condition for the same spot. The microscope includes at least one light source, an illumination field stop, and a microscope objective that images the stop onto a workpiece supported by a movable platform. The objective also forms an image of the illuminated portion of the object. An aperture in a second stop and intersecting the image plane passes light from part of the image to the spectrometer, while viewing optics are used to view the image. In one embodiment, a detector is placed at the zero order position, while in another embodiment a laser is placed at the zero order position. In the later embodiment an integrator circuit connected to the detector array replaces the zero order detector for measuring the total intensity of light entering the spectrometer. A best focus condition occurs when the total intensity is a maximum for a positive confocal configuration, i.e. where source and detector are on opposite sides of their respective field stops from said workpiece, and a minimum for a negative confocal configuration, i.e. where the source and workpiece are on the same side of a reflective illumination field stop with aperture. The movable platform may be scanned axially to achieve and maintain object focus as the object is scanned transversely.

30 Claims, 5 Drawing Sheets

CONFOCAL MEASURING MICROSCOPE WITH AUTOMATIC FOCUSING

TECHNICAL FIELD

This invention relates to a measuring microscope having an aperture which determines the workpiece region to be measured, and incorporating a focusing system based upon a generalization of the confocal microscope. The invention relates especially to a microspectroreflectometer that is employed to determine the local thickness of an object by light interference, and which incorporates such a focusing system.

BACKGROUND ART

There is a broad class of measuring microscopes which project an image of a workpiece upon an aperture, and which measure properties of the light passing through this aperture, in order to characterize a particular small area, or a sequence of such areas, on the workpiece. We may describe this class as "aperture-projecting measuring microscopes."

One example of such an instrument is the microspectrophotometer, which characterizes the light spectroscopically. A microspectrophotometer which includes an illumination source for providing light to the workpiece, and means for determining the ratio of reflected light intensity to incident light intensity, as a function of wavelength, is called a microspectroreflectometer.

All aperture-projecting measuring microscopes require means to establish accurate focus of the microscope upon the selected area on the workpiece, so that the light passing through the aperture will correctly represent the properties of the selected area. In some cases it suffices for viewing means and large-field illumination to be provided, so that the instrument user can determine visually whether the instrument appears to be in focus. To increase the speed and reproducibility of measurements, it is preferable to provide automatic equipment to indicate when focus is correct, and in some cases to provide means for automatic adjustment of axial distance between the object and the microscope objective lens, so that the instrument is automatically driven to best focus.

When the workpiece to be measured has topography whose depth is comparable to or larger than the depth of field of the measuring microscope, it becomes particularly important that the focusing mechanism be responsive to the local surface altitude, in substantially the same region where the measurement is to be made. One group of workpieces that often exemplify this requirement are patterned semiconductor wafers used in the fabrication of integrated circuits.

The focusing systems to be described in this specification are suitable for use with aperture-projecting measuring microscopes. They are, in particular, suitable for use with microspectroreflectometers.

It is known that the best focusing height of a microscope may be determined by an apparatus in which the microscope objective projects upon the workpiece the image of a pointlike light source, and reimages the illuminated workpiece region on one or more pointlike apertures, behind which lie photoelectric detectors. Such an apparatus is described by Lacotte et al. in U.S. Pat. No. 3,912,922.

By "pointlike" is meant that the light source or aperture is smaller than the diffraction limit, so that the size and shape of images of the light source and aperture on the workpiece are determined primarily by the laws of diffraction, most detailed geometric information about the original shape being lost in the projected image. In the case of an essentially perfect and unobstructed microscope objective, the image is the wellknown Airy disc.

It has been shown possible to construct a profilometer (i.e. a measuring microscope for measuring the altitude profile of a surface) by employing such focus-sensing apparatus. Such a profilometer is described in D. K. Hamilton et al., "Surface Profile Measurement Using the Confocal Microscope", *Journal of Applied Physics* 53(7), 5320 (July, 1982), which is incorporated herein by reference. In such a profilometer, the focus sensor determines, at each of a series of points on the surface, the objective-to-stage distance that best maintains the focus of the objective on the surface; the record of the series of distance measurements represents the profile of the surface.

To understand how the focusing systems of our invention differ from other focusing systems, it is useful to review briefly some well-known principles of the confocal microscope. Such microscopes are described more fully in T. Wilson and C. Sheppard, *Theory and Practice of Scanning Optical Microscopy*, Academic Press, 1984, which is incorporated herein by reference.

Figures 1, 2:
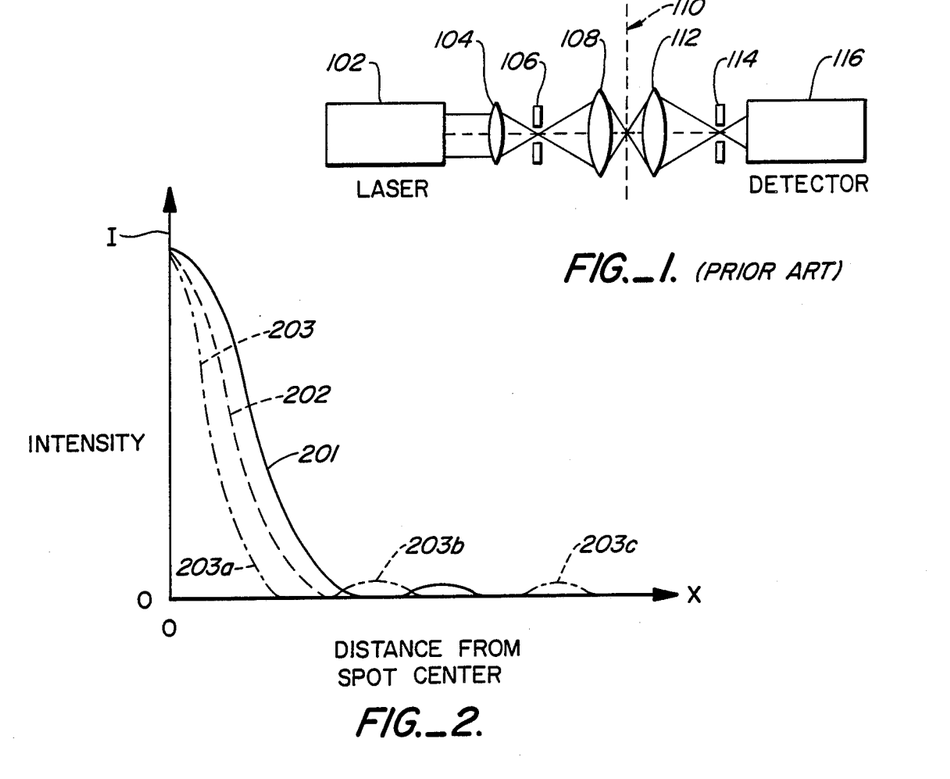
FIG. 1 is a simplified side view of a transmission-type confocal microscope of the prior art.
FIG. 2 is a graph of light intensity versus position for an image of a single point object as seen through a conventional microscope, a confocal microscope with two circular pupils, and a confocal microscope with two annular pupils.

FIG. 1 shows schematically a simple and common form of confocal microscope. Laser 102 produces a beam of light, which is brought to a focus by lens 104 on pinhole 106. Pinhole 106 is small enough to be substantially smaller than the diffraction limit for this optical system, so that laser light coming through the pinhole is effectively a point source. Condenser lens 108, which must be of high optical quality (often a microscope objective is used for this function) forms an image of pinhole 106 on the transparent object which is to be observed. The object (not shown) lies in object plane 110, and may be moved transversely to the optical axis of the instrument, so as to measure a profile of transmissivity vs. position. This instrument is, in other words, a form of microdensitometer. Objective lens 112, which typically has the same numerical aperture as condenser 108, forms an image of the illuminated spot on detector pinhole 114, behind which lies detector 116. Detector pinhole 114 is smaller than the diffraction limit.

Other known variations of the confocal microscope provide for building up a map or an image of an object not by moving the object, but rather by moving optical elements such as lenses or mirrors, so as to cause the observed spot to move. For simplicity in presentation, our invention will be described with respect to moving-object microscopes, but the moving-optics variations are also contemplated.

The confocal microscope provides better spatial resolution than does a conventional microscope. This point is illustrated by FIG. 2, which is the graph of the radial distribution of intensity that would be observed by the FIG. 1 microscope, as it scanned across a pointlike object.

Curve 201 is the intensity distribution that would be observed if either pinhole 106 or pinhole 114 were absent. This curve is just the well-known Airy intensity distribution that is observed with a conventional scanning microscope.

Curve 202 is the distribution observed with both pinholes in place. The observable enhancement in resolution is explained by the fact that the resolution is a product of two Airy-disc images. As the point of measurement moves away from the center of the actual pointlike object, the intensity of illumination falls off according to curve 201, and the sensitivity of the detector also falls off according to curve 201. The net sensitivity curve 202 is the product of these two curves.

Curve 203, representing the sensitivity of a confocal microscope with annular apodizing apertures (not shown) inserted in the pupils of each of lenses 108 and 112, is shown as one example of the fact that more elaborate versions of the confocal microscope can have even higher resolution, typically at the expense of some residual sensitivity at large distances from the center of the pattern. Thus the central portion 203a of curve 203 is narrower than the central portions of curves 201 or 202, but the sensitivity in rings 203b and 203c is higher than anything seen with curves 201 and 202. The effect on imaging is that resolution improves at the expense of introducing more artifacts in the image. For simplicity, our invention is described without the presence of annular apodizing apertures. We contemplate, however, the optional use of such apertures, or of more complex apodizing apertures.

Figure 3A:
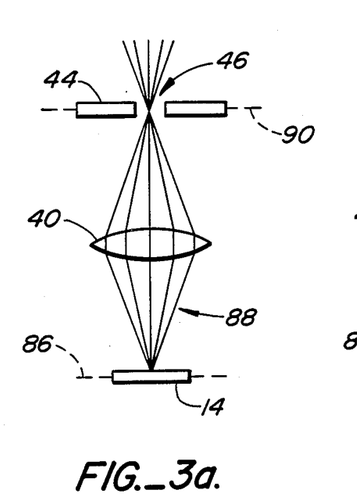
FIGS. 3a–3c are simplified side views of a confocal microscope portion for an object respectively in focus, below the focal plane and above the focal plane.
Figure 3B:
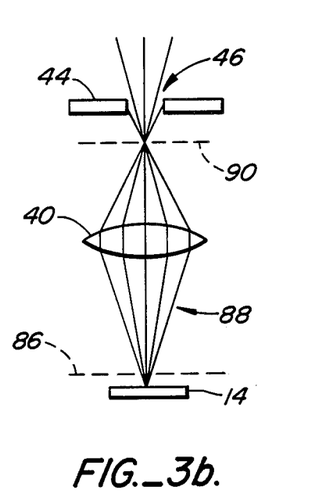
Figure 3C:
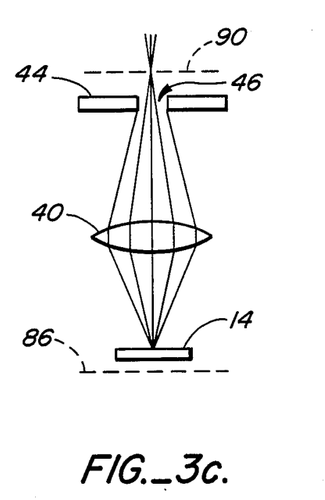
Figure 4A:
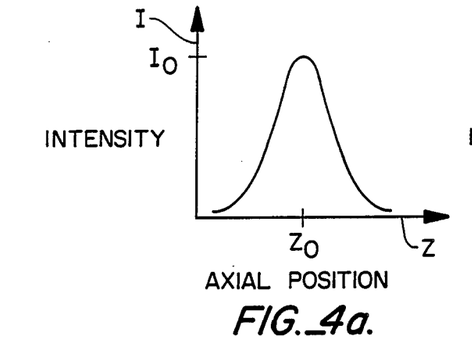
FIG. 4a is a graph of detected light intensity by confocal microscopes in FIGS. 3a–3c. vs. the axial position of an object.

FIG. 3 illustrates a second known property of the confocal microscope which is of importance in understanding our invention. This figure shows just the detection half of a system like that of FIG. 1, in three different conditions of focus. With reference to FIG. 3a, object 14 is imaged by microscope objective 40 onto an image plane 90 coinciding with aperture 46 in field stop 44. This condition occurs when object 14 is "in focus" wit respect to aperture 46. Note that the bundle of light rays 88 originating from a pointlike region on object 14 lying on a focal plane 86 comes to a focus at an image plane 90. All of these rays pass through aperture 46. In FIG. 3b, the object 14 lies below focal plane 86, and the image plane 90 is located below stop 44. Only some of the light rays in bundle 88 pass through aperture 46. Likewise, in FIG. 3c, object 14 lies above focal plane 86, and the image plane 90 again does not coincide with stop 44. Only some of the light rays in bundle 88 can pass through aperture 46. This results in the condition shown in FIG. 4a, where the intensity I of light passing through the aperture is at a maximum value $I_0$ when the axial position Z of the object coincides with the focal plane position $Z_0$.

This variation of the confocal microscope's response with focus condition is the basis of profilometers such as that described in the Hamilton et al. article cited above.

Figure 5:
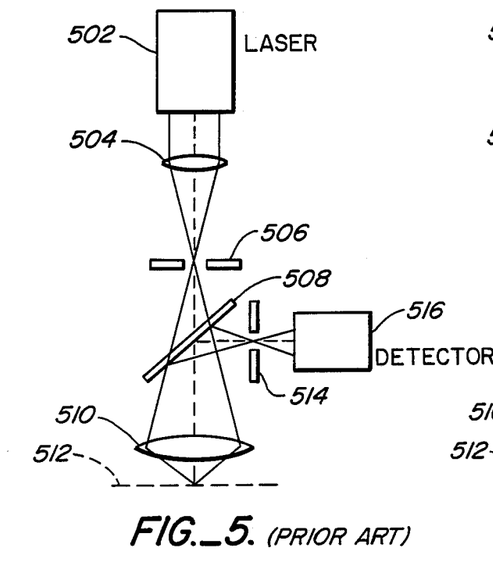
FIGS. 5 and 6 are simplified side views of reflection-type confocal microscopes of the prior art.

It is possible to construct a confocal microscope to work in reflective mode. In such an instrument, one form of which is illustrated schematically in FIG. 5, a single lens 510 acts both as condenser and objective. Laser 502 emits a beam of light which is focused by lens 504 on source aperture 506. Light which passes through aperture 506 then passes through beamsplitter 508, and is focused by objective 510 on a workpiece (not shown), which usually lies in object plane 512. Light reflected or scattered from the workpiece is gathered by objective 510, and focused, via beamsplitter 508, on detector aperture 514, behind which is located detector 516. The operation of the reflection mode confocal microscope is similar to that of the transmission confocal microscope previously described.

Figure 6:
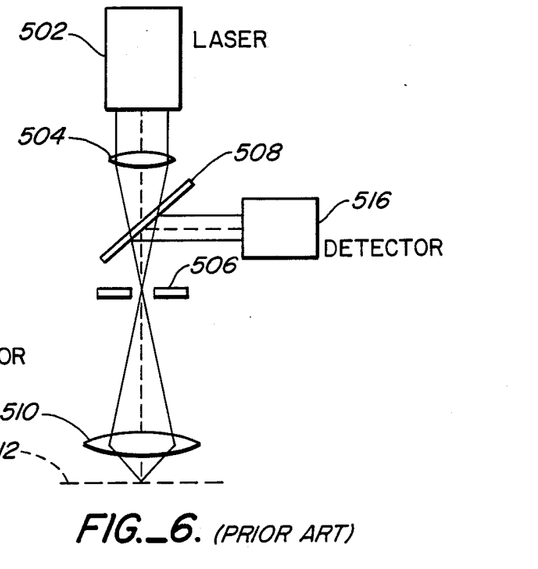

It is also possible to construct a reflection confocal microscope in which a single aperture is shared by the illumination and detection systems. One example of such a configuration is shown in FIG. 6. An instrument according to FIG. 6 is described in L. Reimer et al., "Lock-In Technique For Depth-Profiling and Magnetooptical Kerr Effect Imaging in Scanning Optical Microscopy", Scanning 9, 17-25 (1987). A particular advantage of such an arrangement is that no precision pinhole alignment is required to attain optimal performance. Whereas in two-pinhole instruments, the source pinhole's image must be accurately positioned in relation to the second pinhole, the single-pinhole system is automatically in alignment at all times.

Although confocal microscope configurations are usually described to include lasers, use of a laser is not in general strictly necessary. The laser is employed because it is an unusually bright light source, permitting high speed measurements with excellent signal to noise ratio. In cases where achieving maximum brightness is not the dominant consideration, it may be advantageous to construct a confocal microscope with an incoherent light source such as a tungsten lamp or an arc lamp. Most of the embodiments of our invention, to be described below, do in fact use incoherent light sources.

We have recognized that, while confocal microscopes have previously been described to use apertures whose size is less than the diffraction limited optical spot at each aperture, it is possible and sometimes advantageous to use larger apertures. In the aperture-projecting measuring microscopes considered in our invention, the size of the aperture is determined by the size of the workpiece area to be characterized, which is often larger than the diffraction-limited spot. We will explain below that there is considerable advantage in constructing a focus-sensing apparatus for use in such instruments by using confocal microscope configurations or our own inventive configuration, called the inverse confocal microscope.

Many aperture-projecting measuring microscopes suitable for modification to include our inventive focusing means have been described in the literature. For example, in U.S. Pat. No. 4,674,883, Baurschmidt discloses a microspectroreflectometer for measuring the thickness and line width of features upon an object, such as thin film structures on a semiconductor wafer. The Baurschmidt microscope incorporates no provision for detecting or automatically adjusting to a condition of best focus.

The accuracy with which the thickness of transparent films at specified locations on wafers or other flat surfaces can be measured is limited by the accuracy of focus of the microscope-spectrometer, which affects not only the resolution of the location on the wafer being measured, but also the amount of light reaching the spectrometer's detector elements. For very thin films, the measurement accuracy may also be affected by both the spectral resolution and the spectral range of the spectrometer. Measuring microscopes currently available can accurately measure the film thickness on unpatterned wafers down to about 10 nanometers. In the case of patterned wafers and other somewhat flat objects having a rough or profiled surface, either a large depth of focus is required or the microscope must be able to bring areas of the surface into focus as the object is scanned.

It is an object of the present invention to provide a measuring microscope capable of automatically focusing on an object as that object is scanned.

It is another object of the present invention to provide a microscope capable of accurately measuring characteristics of a workpiece area, such as the thickness of thin films on patterned wafers for thicknesses in a range from less than 2 nanometers to more than 5000 nanometers.

DISCLOSURE OF THE INVENTION

We have invented an aperture-projecting measuring microscope incorporating one or more of a class of autofocusing systems that may be described broadly as "generalized confocal microscopes." The class includes variations on conventional confocal microscope systems, also referred to herein as "positive confocal microscopes," and an entirely new optical arrangement which may be called the "inverse confocal microscope." In a case of particular interest, the measuring microscope is a microspectroreflectometer. In another case of particular interest, the measuring microscope is a profilometer.

The inverse confocal microscope configuration has not previously been employed, to our knowledge, for any purpose, and in particular has not been employed in an autofocusing system for a microspectroreflectometer or a profilometer. The positive confocal microscope configuration is well known, but to our knowledge has not previously been used for focusing of a microspectroreflectometer, or of any other aperture-projecting measuring microscope whose field aperture exceeds diffraction-limited size.

Figure 11:
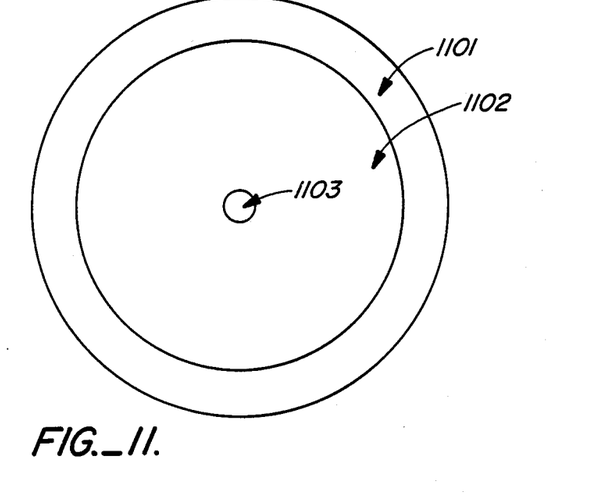
FIGS. 11 and 12 are plan views of two possible field stops for use in the invention in FIGS. 9 and 10.

According to one aspect of our invention, the measuring microscope may include an autofocusing system based on a positive confocal microscope configuration, incorporating an innovative field stop that provides efficiently both for effective autofocusing and for large-field viewing of the workpiece. An example of such a field stop is shown in FIG. 11. The highly transmissive central portion 1103 of this stop provides a small bright light source that may be used as the basis for focusing the microscope while the larger, partially transmissive region 1102 provides broad-area illumination for viewing.

According to another aspect of our invention, the measuring microscope incorporates an inverse confocal microscope configuration. The innovative nature of this configuration may be seen by noting that in all of the confocal microscopes described in the Background section above, source and detector apertures are always used in transmission. This is to say that in the illumination path the light source is on one side of the illumination aperture and the object plane is on the other side. Similarly, in the detection path, the object plane is on one side of the detection aperture and the detector is on the opposite side. This arrangement, that apertures are used in transmission, is in fact common to all prior art confocal microscopes.

The inverse confocal microscope differs from conventional confocal microscopes in that at least one of the apertures, preferably the illumination aperture, is used in reflection. One simple example of such an arrangement is illustrated schematically in FIG. 7. A beam of light emitted by source 702 is focused by lens 704 on aperture 716 in mirror 706. The size of the focused spot of light, in the vicinity of aperture 716, is large enough so that a significant portion of the light is reflected from the mirror surface, rather than passing through the aperture. The reflected light is focused by objective 708 on the object 709, in object plane 710. Light reflected or scattered by the object is imaged by the objective in the vicinity of aperture 716, some of that light passing through the aperture to strike detector 714. Light trap 712 traps rays coming through aperture 716 directly from source 702, so that only rays coming from object 709 can reach detector 714.

Figure 7:
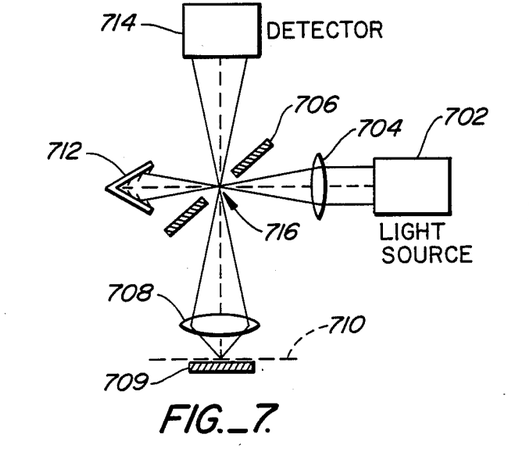
FIG. 7 is a simplified side view of an inverse confocal microscope of the present invention.

Consider now the dependence of light intensity seen by detector 714 upon the axial position of object 709. First imagine what the performance would be, from the standpoint of geometrical optics, if objective lens 708 were perfect and diffractive effects were of no importance. With the object in perfect focus, an image of aperture 716 would be projected upon object 709 as a dark shape, surrounded by a bright spot. Objective lens 708 would re-image this dark shape back upon aperture 716, and would reimage the light coming from the object to strike the areas of mirror 706 that surround aperture 716, so that no light from the object would go through the aperture. With object 709 positioned above or below the optimal focal plane, some of the light that originated at the mirror regions surrounding aperture 716 would be so re-imaged as to pass through the aperture. Thus there would be a null in detector output, corresponding to the location of best focus.

Figure 8:
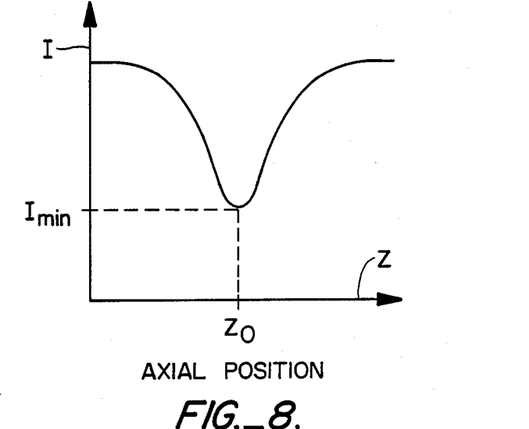
FIG. 8 is a graph of light intensity measured by the microscope in FIG. 7 versus the relative distance between microscope objective and workpiece.

In the presence of lens imperfections and of the real influence of diffraction, imaging of the aperture shape will be imperfect, so that some light will reach detector 714 even at best focus. Still, we find that a well-defined minimum is observed, which can be used as the basis of an autofocus system. A typical output pattern is shown in FIG. 8. The minimum value of detected intensity, $I_{min}$, occurs at the position of best focus, $z_0$.

An advantage of constructing a measuring microscope such as a microspectroreflectometer with a focusing system configured as a generalized confocal microscope is that many of the optical functions required for focusing can be performed by optical elements that are required by other functions of the instrument.

A second advantage of the generalized confocal microscope in this application is that it avoids a major ambiguity associated with focusing systems based on conventional image analysis methods. It is known that in a conventional microscope, when the image is in best focus, the intensity at each point in the image will be *either a minimum or a maximum*. Without a priori knowledge of the object in view, it is impossible to predict whether a minimum or a maximum will be seen (see G. Hausler et al. *Applied Optics* 23 (15), 2468 (1 August 1984)). With a generalized confocal microscope, it is predictable from the design of the microscope whether a minimum or a maximum will be observed, which simplifies the operation and the required control circuitry.

A third advantage of constructing a measuring microscope with a generalized confocal microscope configuration to determine best focus is that such a focusing system inherently establishes best focus in substantially the same area of the viewed object where the measurement is to be made.

BEST MODE FOR CARRYING OUT THE INVENTION

Figure 9:
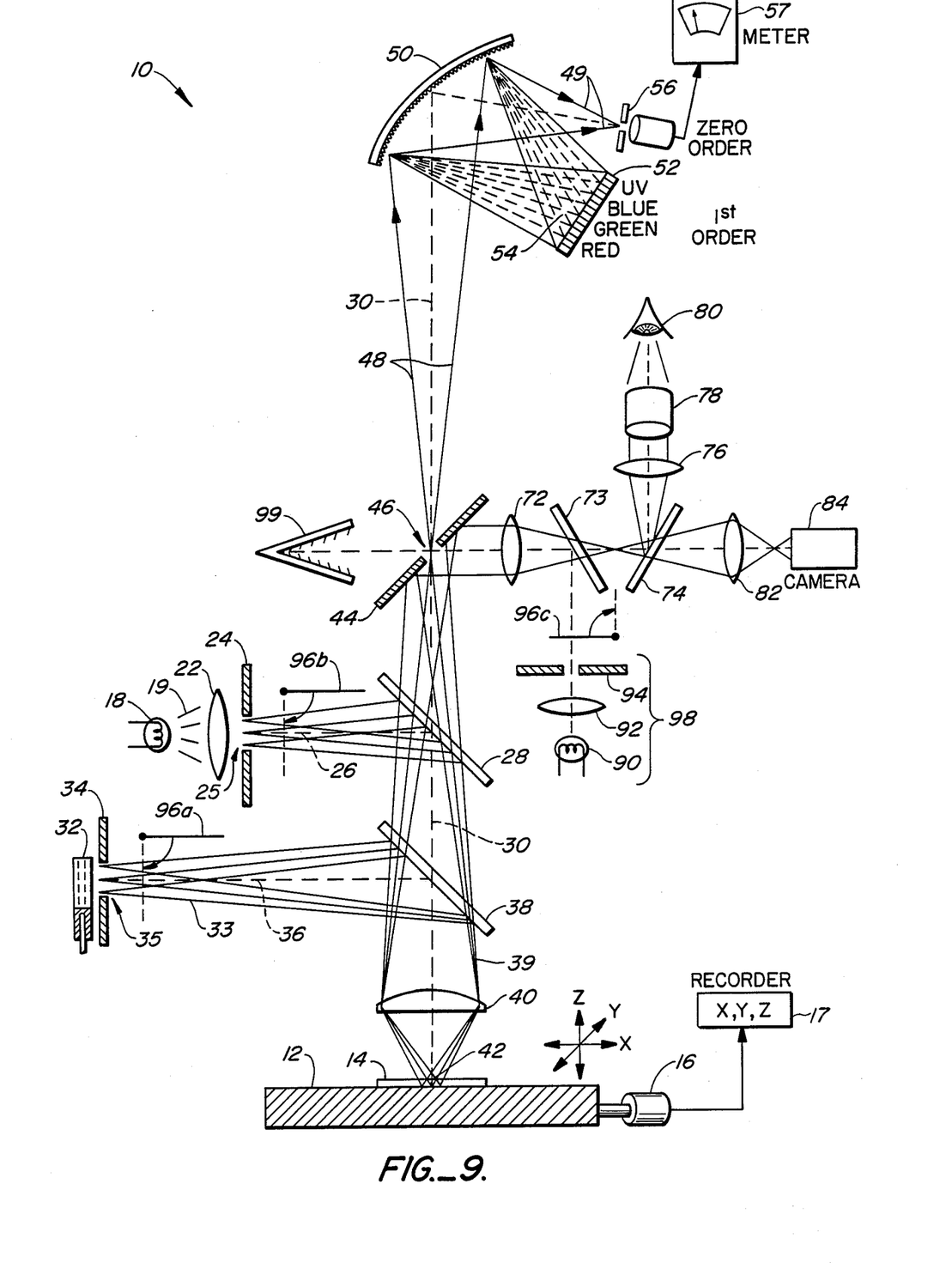
FIG. 9 is a simplified side view of a first embodiment of the present invention.
Figure 10:
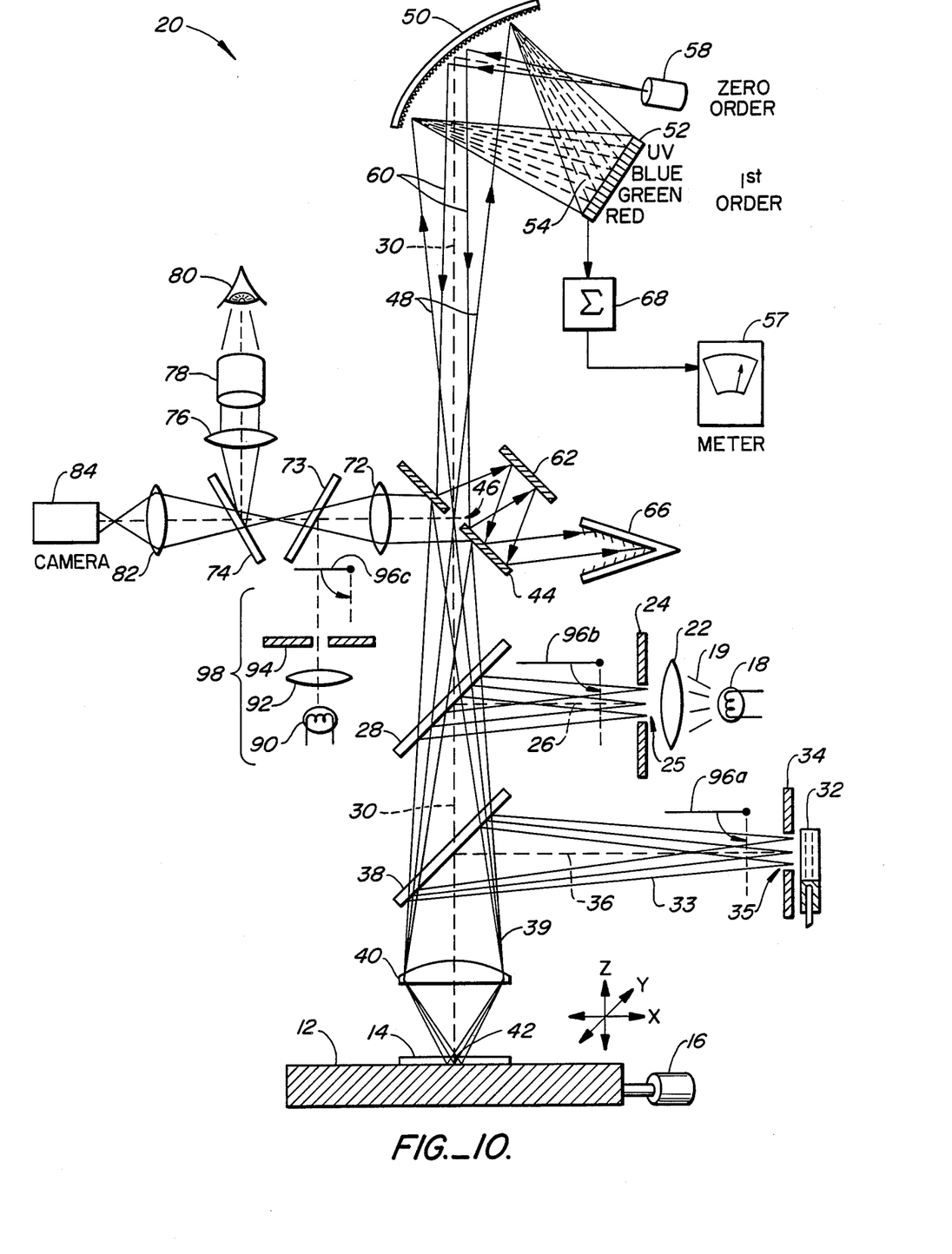
FIG. 10 is a simplified side view of a second embodiment of the present invention.

With reference to FIGS. 9 and 10, each of measuring microscopes 10 and 20 has a platform or table 12 for supporting an object 14. One or more motors 16 move platform 12 in at least an axial direction Z. Typically, three motors are used, each operating independently, to move platform 12 and therefore object 14 in mutually orthogonal directions X, Y and Z. However, for clarity, only one motor is seen in the drawings. Object 14 is substantially flat. The term "substantially flat" does not mean that object 14 must have a perfectly planar surface, nor even a surface which is entirely within the depth of focus of the microscope optics to be described below. Rather, the variations in height, if any, of the object are substantially less than the length and width dimensions of the object, such as in a semiconductor wafer with or without circuit patterns formed thereon. The reflectivity of object 14 may be either specular or diffuse.

One use to which this invention may be put is to measure the thicknesses of thin film coatings applied to a wafer surface so as to determine whether any unacceptable thickness variations are present. Such an application relies on variations in reflected light intensity for different wavelengths of incident light due to the interference produced by partial reflections from top and bottom surfaces of the thin film. Other applications for measuring microscopes with spectrometers are also known. While the invention described herein is a reflective system, a person skilled in the art can easily see how to adapt the platform 12 and microscope elements to illuminate a light transmissive object from below.

The measuring microscopes 10 and 20 have at least one light source 18 which emits a broad spectrum of visible light 19. Typically, light source 18 is a tungsten filament-type incandescent lamp, although other visible light sources may also be used. A condenser lens 22 collects light 19 and directs it at a field stop 24 with an aperture 25.

It should be understood that other and more complex illuminator arrangements, which are well known, may be used with light source 18, and with the other light sources which will be described below. It may be useful, for example, to incorporate an additional lens and an aperture stop in the illuminator, so as to reduce stray light in the system. In describing this and the other illuminators in the instrument, we have described very simple illumination optics, so as to concentrate on essential components of the invention.

The light 19, now a generally columnar beam, travels along an optical path 26 to a beamsplitter 28, where it is deflected into the main axial beam path 30.

A second light source 32 emitting ultraviolet light is preferred. Typically, second light source 32 is a low-pressure mercury vapor discharge lamp. However, any other lamp that emits ultraviolet light, such as a deuterium continuum light source, may be used. Ultraviolet light 33 may be limited by a field stop 34 with aperture 35. Light 33 travels along an optical path 36 to a beamsplitter 38, where it is deflected into main axial beam path 30. Ultraviolet light extends the spectral range over which thin film thickness may be measured, thereby enabling an accurate thickness measurement to be made for thicknesses on the order of 2 nm or less. The use of a second light source is optional.

A microscope objective 40 focuses the combined visible and ultraviolet light beam 39 to a small spot 42 on the object 14. Microscope objective 40 further functions to form a magnified real image of at least a part of the illuminated portion 42 of object 14. The image is formed in a plane perpendicular to main optical axis 30. This plane intersects a transmissive aperture 46 of a reflective stop 44 when the portion 42 is in focus. Typically, the illuminated portion 42 is a 17 μm diameter spot, and the microscope objective 40 forms the image of this spot with a magnification of about 36 times. Aperture 46 may be either a hole or slit, which typically has a diameter or width of about 108 μm, so as to let light pass corresponding to a 3 μm diameter or wide region of object 14.

It is important, for best operation, that the entirety of aperture 46 be in sharp focus on object 14, so that the area of object 14 that is to be measured will be well defined. In one example of an instrument according to our invention, aperture 46 is a rectangle, 108 μm by 153 μm in size, and reflective stop 44 is at 45° to the optical axis 30 of the system, so that the projection of aperture 46 perpendicular to the axis is a 108 μm square, and its image on object 14 is a 3 μm square. Objective 40 has a numerical aperture of 0.5 and a magnification of 36, so that at the plane of aperture 46 the depth of field is about +/−1.3 mm. With this large depth of field, all of aperture 46 is in sharp focus, despite its tilt.

Aperture 46 is the entrance to a spectrometer. Light 48 that passes through aperture 46 impinges on a diffraction grating 50 disposed across main optical axis 30. Diffraction grating 50 is preferably a reflective concave holographic grating, and most preferably a field-flattened aberration-corrected holographic grating, such as those available from Instruments SA, Inc., of Metuchen, NJ. The design and proper use of such gratings is discussed in the literature. One reference is J. M. Lerner et al., "Aberration Corrected Holographically Recorded Diffraction Gratings", *Proc. SPIE* 240, 72 (1980). Ruled gratings may also be used. Grating 50 is curved to present a concave surface to light 48, the grating acting in effect as a concave mirror for the undispersed zero order light 49. The spectrometer also includes a detector array 52 disposed in a position relative to grating 50 so as to receive diffracted light 54, typically in the first diffraction order. The detector array is positioned along the tangential focal locus of the grating. Typically, detector array 52 is a linear photodiode array with about 512 detector elements. Detector elements at one end of array 52 receive red visible light while detector elements at the opposite end of array 52 receive either blue visible light or ultraviolet light depending on whether or not a second light source 32 emitting ultraviolet light is included. It will be understood by those skilled in the art that our invention may be employed with other known forms of spectrometers, such as those relying on plane gratings or on prisms to provide spectral dispersion. The field-flattened concave holographic grating spectrometer is preferred because of its simplicity.

Because a microspectroreflectometer is required to make accurate measurements over a range of wavelengths, objective 40 should preferably have geometric imaging performance that is substantially insensitive to wavelength over the range of interest. One class of objective that meets this criterion are the all-reflective Ealing-Beck microscope objectives, sold by Ealing Electro-Optics, Inc., of South Natick, Massachusetts. When such an objective is to be used over a very wide spectral range, such as 250 nm through 800 nm, it can be procured with special broadband reflective coatings.

The beamsplitters employed in our invention, such as beamsplitters 28 and 38, must be so designed as to avoid introducing significant geometric or chromatic aberrations in the optical system, and so as to avoid creating spurious images of significantly deleterious intensity. Means of configuring and coating beam-splitters to achieve these ends are known to those skilled in the art. For the purposes of the numerical examples cited in this specification, it has been assumed that the beamsplitters are 1 mm thick fused silica plates, each having an antireflection coating on one face and a multilayer dielectric partially-reflecting coating on the other face.

In FIG. 9, the first microscope embodiment 10 has a focus condition detector 56 positioned to receive undispersed zero order light 49 from grating 50. In FIG. 10, on the other hand, the second microscope embodiment 20 has a bright monochromatic light source, such as a laser, in the zero order position, emitting a beam 60 directed via grating 50 onto the back or spectrometer side of stop 44. In order to keep stray light reflected off of stop 44 from reaching detector array 52, any reflected light is directed by one or more mirrors 62 into a light trap 66. Because the zero order position is occupied by laser 58, the focus condition is determined by linear detector array 52 in conjunction with an integrator circuit 68 receiving electrical signals from array 52. Integrator circuit 68 adds the outputs of the detector elements of array 52 to obtain a measure of the total intensity of light passing through aperture 46. In either microscope embodiment 10 or 20, the intensity value obtained either from focus condition detector 56 in FIG. 9 or from integrator circuit 68 is FIG. 10, is used as an electrical feedback signal to control the motor 16 for adjusting the axial position Z of object 14, the object being considered to be in focus when the measured intensity is a maximum or minimum. As will be explained further below, the maximum is selected when the system is operated as a positive confocal microscope, and the minimum is selected when the system is operated as an inverse confocal microscope.

The microscopes 10 and 20 in FIGS. 9 and 10 include viewing optics which enable a user to see the magnified image of the illuminated object portion for target acquisition, i.e. for locating the particular spots of the object which are to be tested. The viewing optics include transfer lenses 72 and 76 which transfer the image to a position immediately in front of an eyepiece 78, through which a human eye 80 may observe the image. A beamsplitter 74 and a third transfer lens 82 transfer the image to a camera 84, from which the image may be observed on a CRT screen. In the embodiment of FIG. 9, a dark spot appears in the center of the observed image due to the passage of light through aperture 46. The dark spot coincides with aperture 46 and corresponds to the exact portion of the object 14 undergoing measurement by the spectrometer. This enables an observer through the eyepiece 78 or camera 84 to identify the spot subject to measurement and to make appropriate corrections by moving the object 14 in X or Y directions or both either manually or with motors 16.

In the embodiment of FIG. 10, laser 58 shines a light beam 60 on the back side of stop 44. This creates a bright spot in the observed image coinciding with aperture 46, and again enables an observer to determine the location of the portion of the object being measured. It will be apparent to those skilled in the art that light source 58 need not be a laser. Any bright source, providing light that can be distinguished by color, brightness, or temporal modulation, will provide a suitable marker function and will suffice to operate the autofocusing system. A laser has the advantage that, because of its uniquely great brightness, it is straightforward to build laser-based systems having high signal-to-noise ratio.

The embodiments of FIGS. 9 and 10 may optionally contain an additional illuminator, designated generally as 98. This illuminator may comprise incandescent light source 90, lens 92, and field stop 94. Light from illuminator 98 may join the optical path through the instrument by way of beamsplitter 73. When additional illuminator 98 is provided, it may also be desirable to include light trap 99 in the FIG. 9 embodiment, to trap light from illuminator 98 that directly enters aperture 46, so that this light does not cause errors in focusing or spectroscopy. Shutters 96a, 96b, and 96c are provided, so that the desired illumination channel can be made active, while the others are blocked. Typically, only one illuminator will be active at a time.

The difference in function between illuminator 98 and the illuminator including light source 18 is that only light from illuminator 98 reaches object 14 via apertured mirror 44, so that a real image of spectrometer aperture 46 is projected upon object 14. Light from light source 18 does not project such an image directly on object 14, even though the viewer sees such an image, because light traveling from object 14 to viewer 80 passes via apertured mirror 44. The importance of this distinction, as to whether or not a real image of aperture 46 is projected on object 14, will become apparent in the description of operation of the several possible focusing modes according to our invention.

In the preferred embodiment of a microspectroreflectometer according to our invention, the one or more light sources employed during autofocus operations are preferably broadband sources rather than monochromatic sources. The reason for this may be understood by considering that, in measuring thin films of some materials on some substrates it is found that at certain combinations of wavelength and film thickness the reflectivity is nearly zero. Such a condition is found, for example, in observing the reflectivity of thin films of silicon nitride on silicon substrates. With a monochromatic light source, the autofocus system could therefore become inoperative at some film thicknesses. It is therefore preferred that the autofocus light source be at least polychromatic, and still more preferred that its output be a spectral continuum.

The key difference between FIGS. 9 and 10 is that in FIG. 9 all sources of light lie below spectrometer aperture 46 and focus sensor 56 lies at the zero-order focal point of grating 50, while in FIG. 10 the source of light for focusing and pointing lies at the zero-order focal point, while the integrated output of array 52 is used for focus sensing. Another useful arrangement (not shown) would have all illumination sources below the spectrometer aperture, as in FIG. 9, but would use the integrated array output for focus sensing, as in FIG. 10. The advantage of this last arrangement is that it requires neither an auxiliary focus sensor 56 nor an auxiliary light source 58.

We will now describe several forms that field stop 24 may take, depending on which embodiment of our invention is to be constructed. The primary variations discussed below, as Embodiments A through E, are variations of the sizes and shapes of stops and the arrangements of illuminators and detectors. Within each of these primary variations there may be further variations, described elsewhere in this specification, having to do with other aspects of microscope construction and function.

Embodiment A (dark pointer, positive confocal focus)

This embodiment uses the general arrangement of FIG. 9, having detector 56 at the zero-order point in the spectrometer.

In this embodiment, field stop 24 has three regions, as shown in FIG. 11. Outer region 1101 is opaque, and is provided for convenience in mounting of the stop. Region 1102 is partially transparent, having optical transmission which may be on the order of 10%. Region 1103 is completely or almost completely transmissive. The outer diameters of regions 1102 and 1103 may be 18 mm and 0.6 mm respectively.

In this embodiment, auxiliary illuminator 98 is not required.

Transmissive aperture 1103 is so aligned as to provide a small circle of bright light on object 14, surrounding the apparent image on object 14 of spectrometer aperture 46. This bright light serves to illuminate the selected point on object 14, to provide for measurement of its reflectance spectrum, and also provides illumination for autofocusing operation, in the manner of confocal microscopy as described above.

Partially-transmissive annular aperture 1102 provides illumination of the general field of view of the microscope objective, to assist the user in identifying the portion of object 14 where a measurement is to be made. Because of the relatively low intensity of this general illumination, it does not in large measure affect the operation of the autofocusing system.

While the physical configuration of elements used for focusing in Embodiment A is similar to that used in a conventional reflective confocal microscope, it differs in that the spectrometer aperture 46 is typically larger than the diffraction limit, in that aperture 1103 is larger even than aperture 46, and in that, for reasons of efficiency in design, the autofocusing system has elements in common with the main microspectroreflectometer. This sharing of elements is what makes this configuration especially efficient for use in microspectroreflectometers. All prior art microspectroreflectometers employing autofocusing systems have required additional optical elements to implement their autofocusing schemes.

The use of a multiregion field stop 24, as described in FIG. 11, is also innovative. It permits correct operation of the autofocusing system without requiring the addition of separate illumination components to provide for viewing of the larger field surrounding the measurement spot.

Embodiment B (dark pointer, inverse confocal autofocus)

In this embodiment, auxiliary illuminator 98 is required. The instrument has the general configuration of FIG. 9, with the autofocus detector at the zero order focus of the spectrometer. The aperture in field stop 94 is made large enough (e.g. 18 mm) so that this illuminator can provide the general viewing illumination required for use of the instrument. Because light from auxiliary illuminator 98 reaches the work via apertured mirror 44, objective 40 casts a real image of aperture 46 upon object 14. This arrangement permits the system to be used as an inverse confocal microscope, as described above with respect to FIGS. 7 and 8.

Figure 12:
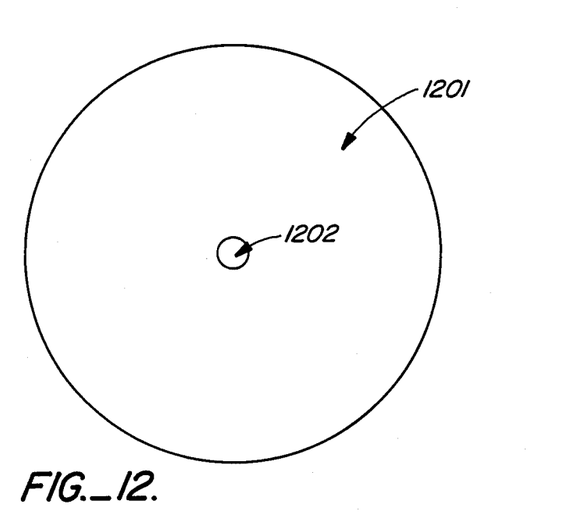

In this embodiment, field stop 24 may have the simple form shown in FIG. 12. Outer region 1201 is fully opaque, and central region 1202, which may be about 0.6 mm in diameter, is fully or almost fully transparent. No partially-transparent region is required, because this illuminator is not now required to provide for largefield viewing, but only for spectroscopy.

The special advantage of this embodiment is that it provides a more sharply defined focus indication than does Embodiment A. This may be understood by considering the relative sizes of spectrometer aperture 46 (typically 0.11 mm) and illumination apertures 1103 and 1202 (typically 0.6 mm). Because the illumination spots are substantially larger than aperture 46, the microscope must go a significant distance out of focus before the amount of light passing through aperture 46 is noticeably reduced. In the inverse confocal arrangement, in which aperture 46 is imaged back upon itself, a much smaller defocus is required before the amount of light transmitted through aperture 46 increases noticeably.

For example, in a microscope having a 0.5 NA, 36× objective, with aperture sizes as indicated, it was found possible to focus to an accuracy of $+/-0.3$ $\mu$m with the positive confocal autofocus arrangement, and to an accuracy of $+/-0.1$ $\mu$m with the inverse confocal arrangement. These numbers were achieved with identical mechanical and electronic components. A broadband tungsten light source was used in illuminator 98 for the inverse confocal measurement, and another tungsten lamp was used, at 18, for the positive confocal measurement. Both lamps were actually present and turned on simultaneously, shutters being used to select the active lamp.

Another advantage of this embodiment is that viewing illumination can be brighter than in Embodiment A, since no attenuation is required to prevent the largearea viewing illumination from confusing the autofocus system.

Yet another advantage of this embodiment is that the small area of the image of aperture 46 on object 14 reduces the likelihood that autofocus readings will be confused by spurious reflections from areas surrounding the area to be measured. It is not possible to reduce the area of the spectrometer illumination spot used as the basis of the Embodiment A autofocus system, because the requirements of accurate film thickness measurement by spectroscopic analysis call for illumination of an area significantly larger than the area in which measurement is to be made.

Yet another advantage of Embodiment B is that there is no need for precision alignment of one aperture image with another. The imaging of aperture 46 upon itself is automatically achieved. The image of illumination aperture 1202, upon aperture 46, need be centered only approximately, since spectroscopy is not nearly as demanding upon alignment of aperture images as is autofocusing.

Embodiment C (bright pointer, positive confocal autofocus)

This embodiment uses the general instrument configuration shown in FIG. 10. A bright spot marks the point on object 14 where a measurement will be made. The autofocus optical configuration is essentially that of the conventional positive confocal microscope of FIG. 6, with the advantage that beamsplitter 506 is not required. As in the other embodiments, most of the optical elements required by the autofocus system are already present to take part in the instrument's main function of recording reflectance spectra.

In this embodiment, field stop 24 may take one of two forms. In a preferred version, field stop 24 is as in FIG. 12, so that it limits the region to which light is delivered during spectroscopic measurement, and auxiliary illuminator 98 is provided for general viewing. In an alternate version, field stop 24 has a large transparent aperture, e.g. 18 mm in diameter, and no auxiliary illuminator is required.

Embodiment D (dual autofocus)

In a particularly preferred embodiment of our invention, field stop 24 has the form of FIG. 12, auxiliary illuminator 98 is provided, and the general instrument configuration is as in FIG. 9. Operating electronics are provided to implement both a positive confocal autofocus system, as in Embodiment A, and an inverse confocal autofocus system as in Embodiment B. The inverse system is used under most circumstances, because of its superior accuracy. The positive confocal system is used in those cases where the microscope is found to be far from correct focus, because of the larger acquisition range associated with the less-accurate positive confocal system. Once the positive system has brought the microscope close to best focus, the inverse system may be engaged to refine the focus.

Embodiment E (variable aperture)

This embodiment employs a variable aperture for field stop 24, and does not require auxiliary illuminator 98. The general instruments configuration is as in FIG. 9, with a detector at the zero-order grating focus. The advantage of this embodiment is that it provides optimal aperture configurations for each of the three functions of viewing, spectroscopy, and focusing, without requiring auxiliary illuminator 98.

In the viewing mode, the aperture in stop 24 is large enough to illuminate the entire useful field of the microscope objective; a typical diameter would be 18 mm. In spectroscopic mode, the aperture is reduced to be much smaller than the full objective field, but still larger than spectrometer aperture 46. For example, if aperture 46 is 0.11 mm in diameter, the aperture in stop 24 may be 0.6 mm in diameter. In autofocus mode, the aperture in stop 24 is made as close in size and shape as possible to the size and shape of spectrometer aperture 46, so as to obtain a sharp autofocus characteristic.

The variation in field stop 24 may be accomplished by using an adjustable iris diaphragm or by employing interchangeable stops, as on a rotatable disc.

Provision For Continuous Automatic Operation

The several embodiments described up to this point permit an optimal focus to be determined at a selected point on object 14, by traversing the vertical movement mechanism while observing the reading of a focus-quality indicator. In operation the x and y drive mechanisms would be used to bring the microscope's line of sight close to the region to be measured. A z-direction traverse would then be completed, and a servomechanism would set the z drive to the height of best focus.

It is also possible, by providing additional equipment, to secure continuous automatic operation of the focusing system. One particularly simple approach to this task is to provide electronic means (not shown) for adding a small vertical dither to the driving voltage on the stage's z mover. The amount of dither would typically be smaller than, or comparable to the intended precision of final focus. Additional electronic means (not shown) would detect the amplitude and phase of the focus detector's output at the frequency of the z dither. It will be clear to those skilled in the art of servo-control design that the sign (i.e. phase) of the detected signal will indicate the direction of defocus, and that the amplitude of the fundamental-frequency signal will drop to zero at best focus. This signed error signal can be used as the basis for a continuously-operating automatic focus control system.

An example of a conventional confocal microscope incorporating dithering equipment such as that contemplated for use in our invention appears in the Reimer et al. article cited above, which is incorporated herein by reference. Note that dithering apparatus and the associated control circuitry can be used in either the positive or inverse confocal arrangement.

Another example of such a microscope is described in T. R. Corle et al. "Distance Measurements by Differential Confocal Optical Ranging", *Applied Optics* 26 (12), 2416 (15 Jun 1987). This article, also incorporated herein by reference, describes an experimental demonstration that such a system can be used to sense surface profile with a precision not worse than 0.01 nm.

By graphically recording the position coordinates x, y and z for a set of best focus points with pen recorder 17, in FIG. 9, a record of the surface profile may be obtained.

Other known means of dithering focus can beneficially be combined with our basic invention. One such means is the provision of a two counter-rotating variable-thickness glass wedges in either the downgoing or returning optical path, on the low-NA side of the microscope objective.

Provision for Manual Operation

An especially economical version of our instrument may be designed, in which the only provision for vertical stage motion is a manually-activated drive of some sort. In such an instrument, the reading of the focus detector would be displayed, as by a zero-center meter 57 shown in FIGS. 9 and 10, and the user would control the stage height so as to optimize the meter reading.

Provision for Inverse Confocal Spectrometer Illumination

All embodiments explicitly described above have assumed that illumination for operation of the spectrometer was to be provided by light sources 18 or 32, even if autofocus illumination was provided by source 98. It has also been found possible to take useful spectra by the light of source 98. This occurs because diffraction of light prevents perfect geometric imaging of aperture 46 upon itself, so that even at best focus, some light from source 98 that reflects from the mirrored region around aperture 46 goes through the aperture upon returning from object 14. This is the light which results in the nonzero value of $I_{min}$ in FIG. 8.

It will similarly be possible for other types of aperture-projecting measuring microscope to take measurements with illumination in the inverse confocal configuration. This may have an advantage in illumination efficiency, for cases in which the aperture is selected to be less than the diffraction limit in size, so as to optimize spatial resolution. In such a case, the light arriving back at aperture 716 from object 709 will approach the intensity it would have if mirror 706 had no aperture at all. Whatever light passes through aperture 716 will then be available for characterization or measurement. In comparison, note that the positive confocal microscope configurations of FIGS. 5 and 6 require the presence of a beamsplitter, which will usually cause the loss of 75% or more of illuminating energy in a two-pass system such as those shown.

Other Embodiments

Numerous variations are known upon the conventional confocal microscope, some of which are described in the literature references cited herein. It is anticipated that inverse-confocal analogs will exist of many of these variations, and the employment of such analogs is contemplated within the scope of our invention.

A particular variation which we contemplate is the inverse confocal variant upon the fluorescence confocal microscope. Such a microscope is described briefly in Wilson and Sheppard, op. cit. In the fluorescence confocal microscope, the configuration is essentially that of FIG. 9 or 10, except that the detector is made sensitive to fluorescent wavelengths stimulated by the light source, rather than to the wavelength of the light source itself. The inverse confocal analog would look like our FIG. 7, with a corresponding modification of the detector.

It would be possible to construct a microspectrofluorometer whose appearance would be similar to that of our FIG. 9 microspectroreflectometer, except that light source 18 would be replaced with a fluorescencestimulating light source, which might be a laser or a high-pressure arc lamp with suitable filters. Focus sensing could employ any of the methods described herein, using either the fluorescence radiation (with appropriate modification of detectors), stimulating-wavelength radiation, or both.

Another example of an aperture-projecting measuring microscope suitable for use with our invention is the microdensitometer, which measures the intensity of light reflected from or transmitted through selected workpiece areas, without spectroscopic characterization.

Some scanning optical profilometers fall into the class of aperture-projecting measuring microscopes suitable for use with our invention. Such a profilometer has a detecting aperture for receiving light from a series of selected points on a surface, means to ensure that the microscope is maintained in best focus on the surface at each measured point, and means to interpret the behavior of the focusing system to produce a measurement of surface profile.

There are specialized versions of the above-mentioned microdensitometers and scanning optical profilometers, often called linewidth measuring microscopes, which have means to determine the widths of selected features on the workpiece, by analyzing the densitometric or profilometric data.

In considering those embodiments of our invention that employ a positive confocal microscope configuration, it will be seen that we have used the word "confocal" broadly, in the sense of "same focal point." Unlike common confocal microscopes, ours typically have illumination and detection apertures which are larger than the optical diffraction limit (aperture size being set by the requirements of the measuring instrument). Also unlike common confocal microscopes, some embodiments of our invention may have illumination and detection apertures which differ in size.

It will always be the case, in either positive or inverse confocal configurations, that the most accurate focus indication is obtained when the size and shape of the illumination and detection apertures are *effectively* identical, which is to say that the geometric image of the illumination aperture, as projected by intervening optics upon the detection aperture, is substantially coincident in size and shape with the detection aperture. Optimally-accurate focal indication may still be achieved when the illumination aperture differs in actual size and shape from the detection aperture, so long as its geometric image is of the correct size and shape.

In some particularly economical embodiments of our invention the illumination and detection apertures have different effective sizes and shapes. While this condition provides less than optimal focusing accuracy, it may still provide adequate focusing accuracy.

Operation

In operation, the focus condition detector 56 of FIG. 9 and the integrator circuit 68 of FIG. 10 measure the intensity of light passing through aperture 46. As previously described, at best focus detector 56 or integrator 68 will find a maximum in intensity for the positive confocal autofocus systems, and a minimum for the inverse confocal systems.

Figure 4B:
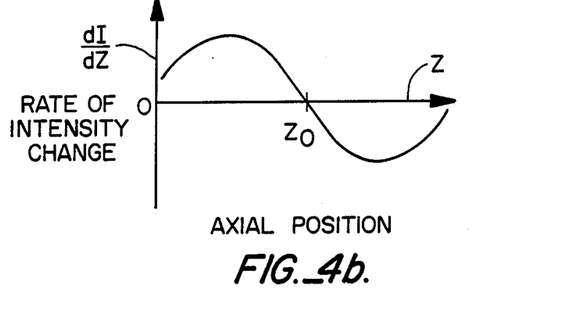
FIG. 4b is a graph of the rate of intensity change in FIG. 4a vs. axial position.

Servo control circuitry of the present invention uses the measured intensity value as a feedback signal to control the motion of the axial scanning motor 16 shown in FIGS. 9 and 10. The focusing response should be at least twice as fast as the spectrometer's sampling rate for other measurement data to enable the object to be in focus for at least part of data sample period. In the embodiments employing positive confocal focusing optics, the direction of focusing response is the direction of increasing light intensity. The derivative of the measured intensity with respect to the axial position (dI/dZ) may be used to direct focusing, as indicated in FIG. 4b. A positive first derivative may, for example, indicate that the axial scanning motor should continue turning in the same direction, while a negative first derivative may indicate that the motor rotation should be reversed. A zero derivative indicates that the focal position $Z_0$ has been reached. In the embodiments employing inverse confocal focusing optics, operation is similar, except that the action of the servo control is to seek minimum intensity rather than maximum intensity.

On rare occasions, it has been found that in addition to the extremum of detected intensity that occurs at best focus, there is a second "false" extremum, at a point far from best focus. This false extremum may be created by scattering patterns of light caused by features on object 14. While various algorithms may be used to distinguish real from false extrema, it is adequate, because of the rarity of the false extrema, to detect the presence of multiple extrema and then to signal the instrument user to select by manual control the correct extremum at which the machine is to optimize focus.

The present invention is thus capable of automatically focusing on an object, and maintaining or quickly reestablishing focus as the object is transversely scanned. Another advantage of the present invention is the use of ultraviolet light, which enables the microscope spectrometer to make accurate measurements of thin film thicknesses and the like to less than 2 nanometers.

We claim:

1. An aperture-projecting measuring microscope comprising
   means for supporting a workpiece to be observed and measured,
   an illumination source producing a light beam directed along an optical path toward said workpiece,
   a stop having a transmissive aperture therein in said optical path, said aperture having a size which is larger than the diffraction limit for said aperture,
   a microscope objective disposed in said optical path between said stop and said workpiece so as to image said stop onto said workpiece, whereby a portion of said workpiece is illuminated, the shape of said aperture being apparent in the image of said stop on said workpiece, said microscope objective also imaging said illuminated portion of said workpiece onto said stop,
   means for measuring at least one property of light passing through said aperture from said workpiece, whereby an area of said workpiece determined by said aperture can be characterized, said at least one property including the intensity (I) of light, and
   means for adjusting the relative distance (Z) between said microscope objective and said workpiece so as to achieve and maintain a condition of best focus, said condition being determined to occur when the rate of change of said measured light intensity with respect to said relative distance (dI/dZ) is zero.

2. The microscope of claim 1 wherein said measuring means comprises
   means for spectrally resolving said light passing through said aperture from said workpiece, and
   means for measuring the intensity distribution with respect to wavelength of light reflected from said workpiece.

3. The microscope of claim 1 wherein said illumination source lies on the opposite side of said stop from said workpiece, light from said source passing through said aperture to illuminate said workpiece.

4. The microscope of claim 1 wherein said illumination source lies on the same side of said stop as said workpiece, said stop being light reflective in the region surrounding said transmissive aperture, light from said source being reflected by said stop to illuminate said workpiece.

5. The microscope of claim 1 further comprising means for indicating said rate of change (dI/dZ) to a user, said adjusting means being manually operable by said user.

6. The microscope of claim 1 wherein said adjusting means is operable automatically, being servo-controlled in response to said rate of change (dI/dZ).

7. A positive-confocal measuring microscope comprising
   means for supporting a workpiece to be observed and measured,
   an illumination source producing a light beam directed along an optical path toward said workpiece,
   a first field stop disposed in said optical path in front of said illumination source, said first field stop having defined therein a substantially transmissive central aperture and a partially transmissive annular aperture surrounding said central aperture,
   a microscope objective disposed in said optical path, said first field stop being imaged by said microscope objective onto said workpiece, whereby a small area of said workpiece to be measured is brightly illuminated by light from said source passing through said central aperture and a larger surrounding area of said workpiece to be observed visually is less brightly illuminated by light from said source passing through said annular aperture,
   a second field stop having an aperture therein, said microscope objective imaging said workpiece in an image plane, said image plane intersecting said aperture of said second field stop when said workpiece is in best focus,
   means on the same side of said second field stop as said workpiece for viewing said imaged workpiece,
   a dark spot corresponding to said aperture of said second stop indicating the location of said small area to be measured,
   means lying behind said second field stop for measuring at least one property of light passing through said aperture of said second stop from said small brightly illuminated area of said workpiece, whereby said small area can be characterized, said at least one property including the intensity (I) of light,
   means for adjusting the relative distance (Z) between said objective and said workpiece so as to achieve and maintain a best focus condition, said best focus condition being that relative distance when said measured intensity (I) is a maximum.

8. The microscope of claim 7 wherein said measuring means comprises
   means for spectrally resolving said light passing through said aperture of said second stop reflected from said workpiece, and
   means for measuring the intensity distribution with respect to wavelength of said spectrally resolved light.

9. The microscope of claim 7 further comprising
   means for scanning said workpiece transversely so as to measure light passing through said aperture of said second stop corresponding to a series of selected small areas on the surface of said workpiece, said adjusting means continuously operable so as to maintain a condition of best focus at each of said selected areas, and means for forming a record of said relative distances (Z) of best focus for each said selected area, said record representing a surface altitude profile of said workpiece along the locus of said selected points.

10. The microscope of claim 7 further comprising means for indicating the measured intensity (I) to a user, said adjusting means being manually operable by said user.

11. An aperture-projecting measuring microscope with inverse-confocal focusing comprising means for supporting a workpiece to be observed and measured, a first illumination source producing a light beam directed along an optical path toward said workpiece, a first field stop disposed in said optical path in front of said first illumination source, said first field stop having a substantially transmissive aperture therein, a microscope objective disposed in said optical path, said first field stop being imaged by said objective onto said workpiece, whereby a small area of said workpiece is illuminated by light from said first source passing through said aperture of said first field stop, a second field stop having an aperture therein, said objective imaging said workpiece in an image plane intersecting said aperture of said second stop, said second stop being reflective, a second illumination source producing a light beam directed along an optical path toward said reflective second stop, said light beam from said second source being reflected by said second stop toward said workpiece, means for selecting which of said first and second illumination sources illuminate said workpiece, means for viewing said imaged workpiece, an area of said workpiece illuminated by said second source being visible with a dark spot corresponding to said aperture of said second stop indicating said small area to be illuminated by said first source for measurement, means behind said second stop for measuring at least one property of light passing through said aperture of said second stop from said workpiece, whereby an area of said workpiece determined by said aperture of said second field stop can be characterized, said at least one property including the intensity (I) of light, and means for adjusting the relative distance (Z) between said objective and said workpiece so as to achieve and maintain a best focus condition, said best focus condition being met when the measured intensity (I) is a minimum.

12. The microscope of claim 11 wherein said measuring means comprises means for spectrally resolving said light passing through said aperture of said second stop reflected from said small area of said workpiece illuminated by said first source, and means for measuring the intensity distribution with respect to wavelength of said spectrally resolved light.

13. The microscope of claim 11 further comprising means for scanning said workpiece transversely so as to measure light passing through said aperture of said second stop corresponding to a series of selected small areas of the surface of said workpiece, said adjusting means being continuously operable so as to maintain a condition of best focus at each of said selected areas, and means for forming a record of said relative distances (Z) of best focus for each of said selected areas, said record representing a surface altitude profile of said workpiece along the locus of said selected points.

14. The microscope of claim 11 wherein said adjusting means is responsive only when said selecting means selects said second light source to illuminate said workpiece.

15. The microscope of claim 11 wherein said adjusting means is first responsive to the measured intensity of light from said workpiece illuminated by said first light source so as to provide gross focusing, and is also responsive to the measured intensity of light from said workpiece illuminated by said second light source so as to provide fine focusing.

16. A microspectroreflectometer comprising, at least one broad spectrum light source producing a light beam, a microscope objective in the path of said light beam, means for supporting a substantially flat object, said light beam being focused to a spot by said microscope objective so as to illuminate at least a portion of said object, said microscope objective forming an image in an image plane of at least a part of said illuminated portion of aid object, means for viewing said image, means defining a transmissive aperture intersecting said image plane for passing light corresponding to a portion of said image, means for diffracting said light passing through said aperture, a linear detector array disposed in a position relative to said diffracting means to receive first order diffracted light, and means for adjusting the axial spacing between said microscope objective and said object so as to thereby achieve and maintain an in-focus condition, said object being considered in focus when the derivative with respect to the object's axial position of the measured intensity of light passing through said aperture is zero.

17. The microspectroreflectometer of claim 16 further comprising a focus condition detector disposed in a position relative to said diffracting means to receive zero order diffracted light, the measured intensity of light received by said focus condition detector representing the intensity of light passing through said aperture.

18. The microspectroreflectometer of claim 16 further comprising an integrating circuit electrically connected to said linear detector array, the sum of light intensities received by said linear detector array representing the intensity of light passing through said aperture.

19. The microspectroreflectometer of claim 16 further comprising a light source located in a position relative to said diffracting means corresponding to zero order light diffraction, said light source directing a light beam toward said aperture via said diffraction means.

20. The microspectroreflectometer of claim 16 wherein said at least one light source comprises a first light source producing visible light and a second light source producing ultraviolet light.

21. The microspectroreflectometer of claim 16 wherein said diffracting means comprises a reflective holographic grating which is curved so as to be concave with respect to impinging light.

22. The microspectroreflectometer of claim 16 wherein said viewing means comprises a microscope eyepiece.

23. The microspectroreflectometer of claim 16 wherein said viewing means comprises a camera.

24. A measuring microscope comprising
means for supporting a workpiece,
an illumination source producing a light beam directed along an optical path toward said workpiece,
a stop having a transmissive aperture therein, said aperture having a first diameter in a viewing mode, a second diameter smaller than said first diameter in a spectroscopic measuring mode, and a third diameter smaller than said second diameter in a focusing mode,
an objective lens imaging said stop onto a workpiece, where a variable size portion of said workpiece is illuminated, said objective lens forming an image of said illuminated portion of said workpiece in an image plane,
a spectrometer stop having an aperture therein, said aperture intersecting said image plane,
means for viewing said image in said viewing mode,
means lying behind said spectrometer stop for spectrally resolving and measuring the intensities of light passing through said aperture of said spectrometer stop in said spectroscopic measuring mode, said resolving and measuring means including means for determining the total intensity of light passing through said aperture in said focusing mode, and
means responsive in said focusing mode to said intensity determining means for adjusting the relative distance between said objective lens and said workpiece so as to achieve a best focus condition, said condition being determined to be met when the rate of change of measured light intensity with respect to said relative distance is zero.

25. A measuring microscope comprising,
at least one broad spectrum light source producing a light beam,
a microscope objective in the path of said light beam,
means for supporting a substantially flat object, said light beam being focused to a spot by said microscope objective so as to illuminate at least a portion of said object, said microscope objective forming an image in an image plane of at least a part of said illuminated portion of said object,
a mirror with a transmissive aperture defined therein, said aperture intersecting said image plane in a position for passing light corresponding to a portion of said image,
means in light reflective relationship to said mirror for viewing said image,
means for diffracting said light passing through said aperture,
a linear detector array disposed in a position relative to said diffracting means to receive first order diffracted light,
a focus condition detector disposed in a position relative to said diffracting means to receive zero order diffracted light, said object being considered in focus when the light intensity measured by said focus condition detector with respect to the axial position of said object is a maximum, and
means for adjusting the axial spacing between said objective and said object so as to thereby achieve and maintain an in-focus condition.

26. The microscope of claim 25 wherein said at least one light source comprises a visible light source and an ultraviolet light source.

27. The microscope of claim 25 wherein said diffracting means comprises a reflective holographic grating which is curved so as to be concave with respect to impinging light.

28. A measuring microscope comprising,
at least one light source producing a light beam,
a microscope objective in the path of said light beam,
means for supporting a substantially flat object, said light beam being focused to a spot by said microscope object so as to illuminate at least a portion of said object, said microscope objective forming an image in an image plane of at least a part of said illuminated portion of said object,
means for viewing said image,
means defining a transmissive aperture intersecting said image plane for passing light corresponding to a portion of said image,
means for diffracting said light passing through said aperture,
a light source located in the zero order diffraction position relative to said diffracting means and directing a light beam toward said aperture,
a linear detector array disposed in a position relative to said diffracting means receive first order diffracted light,
an integrating circuit electrically connected to said linear detector array, the sum of light intensities received by said linear detector array representing the intensity of light passing through said aperture, and
means for adjusting the axial spacing between said objective and said object so as to thereby achieve and maintain an in-focus condition, said object being considered in focus when said sum of light intensities received by said linear detector array is a maximum with respect to the axial position of said object.

29. The microscope of claim 28 wherein said at least one light source comprises a visible light source and an ultraviolet light source.

30. The microscope of claim 28 wherein said diffracting means comprises a reflective holographic grating which is curved so as to be concave with respect to impinging light.

* * * * *

UNITED STATES PATENT AND TRADEMARK OFFICE
CERTIFICATE OF CORRECTION

PATENT NO. : 4,844,617

DATED : July 4, 1989

INVENTOR(S) : Herman F. Kelderman et al.

It is certified that error appears in the above-identified patent and that said Letters Patent is hereby corrected as shown below:

Column 3, line 32, "wit respect" should read -- with respect --.

Column 6, line 29, "z_0" should read -- $Z_0$ --.

Column 14, line 50, this is not a new paragraph but a continuation of the preceding paragraph.

Claim 16, column 20, line 34, "aid object" should read -- said object --.

Claim 28, column 22, line 29, "object" should read -- objective --.

Claim 28, column 22, line 43, "means receive" should read -- means to receive --.

Signed and Sealed this

Fourth Day of September, 1990

Attest:

HARRY F. MANBECK, JR.

Attesting Officer     Commissioner of Patents and Trademarks